(12) United States Patent
Venkataraman Palani

(10) Patent No.: US 11,789,784 B1
(45) Date of Patent: Oct. 17, 2023

(54) MONITORING AND MANAGEMENT OF A CLOUD-BASED COMPUTING SYSTEM

(71) Applicant: Bank of America Corporation, Charlotte, NC (US)

(72) Inventor: Karthik Rajan Venkataraman Palani, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/166,266

(22) Filed: Feb. 8, 2023

(51) Int. Cl.
*G06F 9/455* (2018.01)
*G06F 9/50* (2006.01)
*G06F 11/07* (2006.01)

(52) U.S. Cl.
CPC .......... *G06F 9/5072* (2013.01); *G06F 9/5077* (2013.01); *G06F 11/0754* (2013.01); *G06F 11/0766* (2013.01); *G06F 2201/81* (2013.01); *G06F 2209/508* (2013.01)

(58) Field of Classification Search
CPC .. G06F 9/5072; G06F 9/5077; G06F 11/0754; G06F 11/0766; G06F 2201/81; G06F 2209/508
See application file for complete search history.

(56) References Cited

U.S. PATENT DOCUMENTS

| | | | |
|---|---|---|---|
| 10,191,778 B1 | 1/2019 | Yang et al. | |
| 10,230,568 B2 | 3/2019 | Maes | |
| 10,235,439 B2 | 3/2019 | Sullivan et al. | |
| 10,871,922 B2 | 12/2020 | East | |
| 10,929,415 B1 | 2/2021 | Shcherbakov et al. | |
| 10,944,811 B2 | 3/2021 | Doctor et al. | |
| 10,976,962 B2 | 4/2021 | Karumbunathan et al. | |
| 11,023,179 B2 | 6/2021 | Karumbunathan et al. | |
| 11,056,244 B2 | 7/2021 | Shelton, IV et al. | |
| 11,308,035 B2 | 4/2022 | Prahlad et al. | |
| 11,470,172 B1 | 10/2022 | Kapoor et al. | |
| 2017/0346696 A1 | 11/2017 | Wipfel et al. | |
| 2020/0136943 A1 | 4/2020 | Banyai et al. | |
| 2021/0117232 A1 | 4/2021 | Sriharsha et al. | |
| 2021/0241898 A1 | 8/2021 | Shelton, IV et al. | |
| 2023/0071714 A1* | 3/2023 | Huo | H04L 41/0895 |
| 2023/0109690 A1* | 4/2023 | Mutha | G06F 9/45558 718/1 |

* cited by examiner

*Primary Examiner* — Kim T Nguyen

(57) ABSTRACT

A method for monitoring and management of a cloud-based computing system is provided. The method includes sending a first data stream to a first pod of a first worker node of a cloud-based computing system. First logs are received from the first pod of the first worker node, which are generated by the first pod while processing the first data stream. A first age of the first pod is determined. In response to the first age being less than a first age threshold, a first failure chance and a first failure timeline are determined for the first pod based on the first logs. In response to the first failure chance being greater than a first failure threshold, a first report is sent to a primary node of the cloud-based computing system, which includes the first failure chance, the first failure timeline, and a first template for the first pod.

20 Claims, 2 Drawing Sheets

MONITORING AND MANAGEMENT OF A CLOUD-BASED COMPUTING SYSTEM

TECHNICAL FIELD

The present disclosure relates generally to monitoring and management of a computing system, and more specifically to a system and method for monitoring and management of a cloud-based computing system.

BACKGROUND

A cloud-based computing system based on the Kubernetes architecture includes a primary node and one or more worker nodes communicatively coupled to the primary node. The worker nodes execute tasks instructed from the primary node. Each worker node includes a plurality of pods, which communicate with services, receive instructions, and execute requested operations. The pods are vulnerable to crashing and may fail without notice for various reasons. The primary node monitors the pods and upon detecting a failure of a pod creates a new copy of the failed pod. This makes the cloud-based computing system not reliable if multiple pods fail at the same time, since users will face latency during creation of a new pod.

SUMMARY

The system described in the present disclosure provides several practical applications and technical advantages that overcome the current technical problems with reliability of cloud-based computing systems.

In general, the reliability problem of the cloud-based computing system may be solved by using a monitoring/management system that is communicatively coupled to the cloud-based computing system. The monitoring/management system sends a data stream to a pod of a worker node of the cloud-based computing system, which triggers various monitoring tasks to be performed by the pod. The monitoring/management system receives logs from the pod that are used to monitor performance, load capacity, memory utilization, volume, and number of processes of the pod. The monitoring/management system may determine an age of the pod and in response to the age being less than an age threshold, determines a failure status of the pod based on the logs. The failure status may include a failure chance and a failure timeline for the pod. In response to the failure chance being greater than a failure threshold, the monitoring/management system sends a report to the primary node. The report may include the failure chance for the pod, the failure timeline for the pod, and a template for the pod. The template includes configuration information of the pod. The primary node receives the report and, in response to receiving the report, determines a load for the worker node. In response to the load being less than a load threshold, the primary node updates a configuration of the pod based on the template.

In some embodiments, the monitoring/management system monitors all pods of all worker nodes of the cloud-based computing system. In other embodiments, the monitoring/management system may monitor select pods in each worker node of the cloud-based computing system. In yet other embodiments, the monitoring/management system may monitor all or select pods in select worker nodes of the cloud-based computing system.

By detecting a failure status of a pod and updating a configuration of the pod based on the failure status before the pod actually fails, latency and data corruption of the cloud-based computing system may be reduced or avoided. Furthermore, by not creating a new copy of a failed or soon-to-be failed pod, computing resources (e.g., memory and/or network bandwidth) that otherwise would be used by the new pod will be saved for other applications. Accordingly, the utilization of computing resources by the cloud-based computing system is reduced.

Accordingly, the following disclosure is particularly integrated into practical applications of: (1) reducing or avoiding latency and data corruption of a cloud-based computing system; and (2) reducing the utilization of computing resources by a cloud-based computing system.

In one embodiment, a system includes a cloud-based computing system and a monitoring/management system communicatively coupled to the cloud-based computing system. The cloud-based computing system includes a primary node and a plurality of worker nodes communicatively coupled to the primary node. Each worker node includes a plurality of pods. Each pod includes a plurality of containers. The monitoring/management system includes a memory and a processor communicatively coupled to the memory. The memory is configured to store a plurality of templates, an age threshold for each pod, and a failure threshold for each pod. Each template includes configuration information of a respective pod. The processor is configured to send a first data stream to a first pod of a first worker node. A first plurality of logs are received from the first pod of the first worker node. The first plurality of logs are generated by the first pod while processing the first data stream. A first age of the first pod is determined. The first age is compared to a first age threshold for the first pod. In response to the first age being less than the first age threshold, a first failure status of the first pod is determined based on the first plurality of logs. Determining the first failure status of the first pod includes determining a first failure chance and a first failure timeline for the first pod based on the first plurality of logs. The first failure chance is compared to a first failure threshold for the first pod. In response to the first failure chance being greater than the first failure threshold, a first report is sent to the primary node. The first report includes the first failure chance for the first pod, the first failure timeline for the first pod, and a first template for the first pod. The primary node is configured to, in response to receiving the first report, determine a first load for the first worker node, compare the first load to a first load threshold and, in response to the first load being less than the first load threshold, update a first configuration of the first pod based on the first template.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
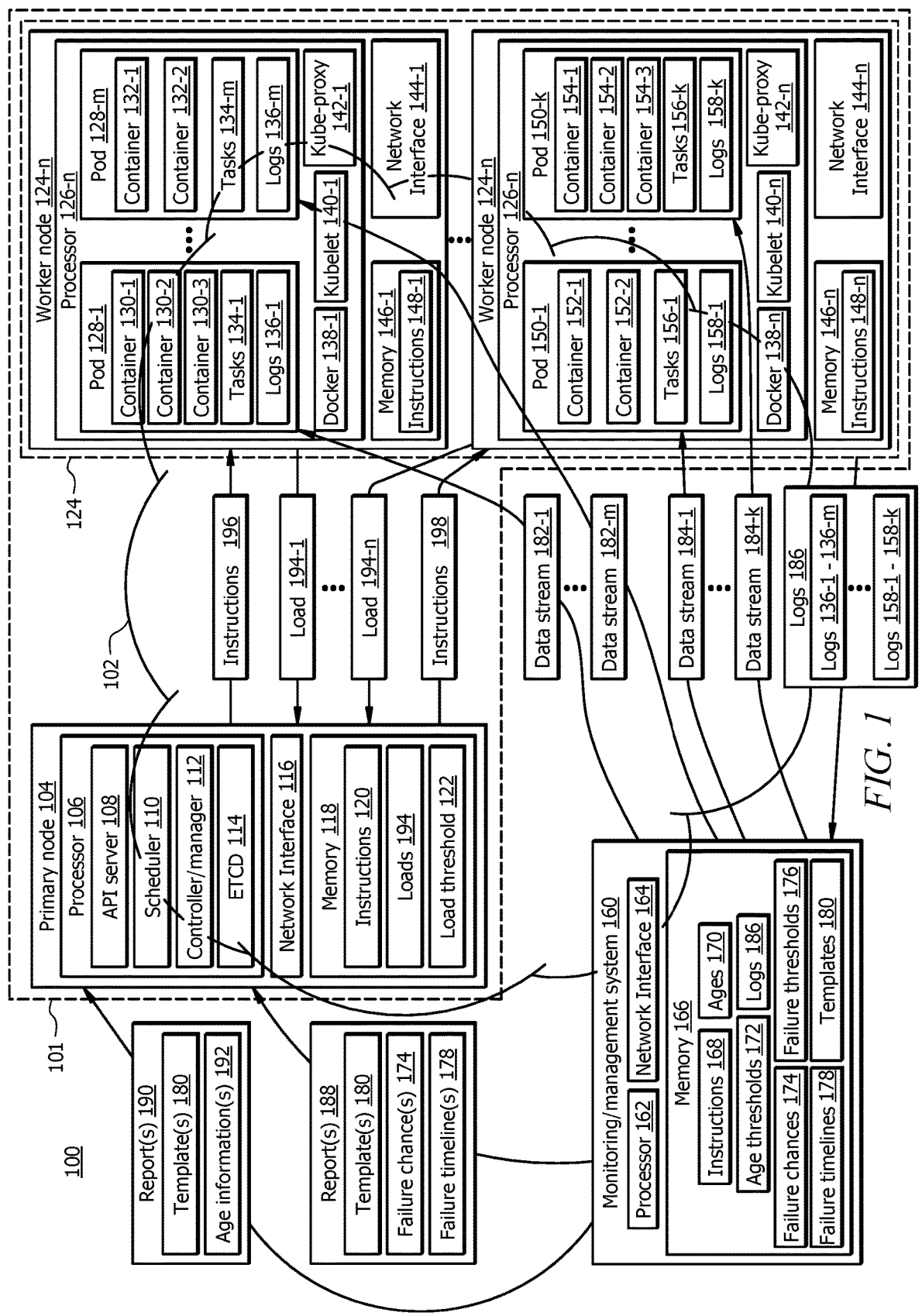
FIG. 1 illustrates an embodiment of a system configured to monitor and manage a cloud-based computing system.
Figure 2:
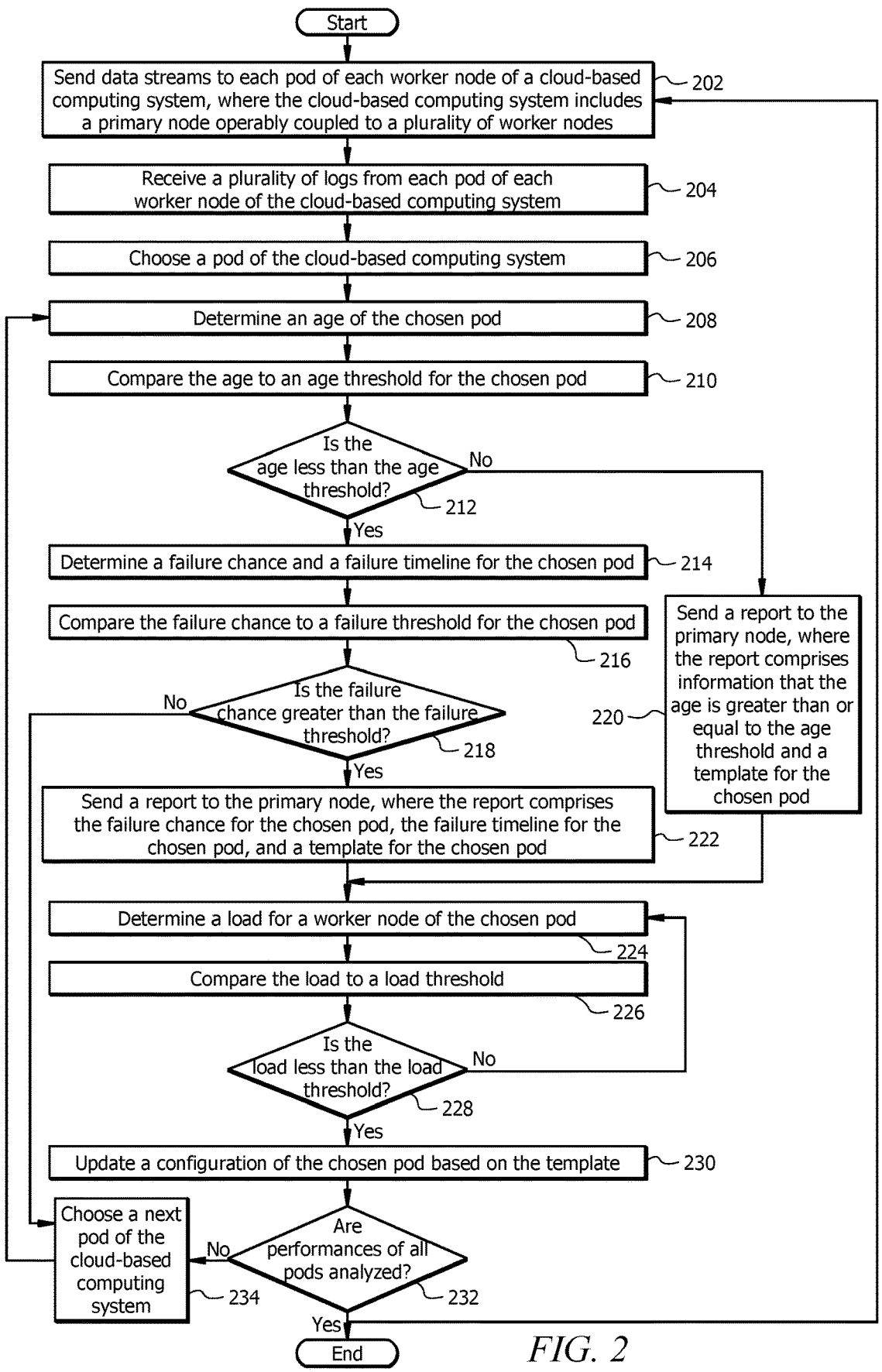
FIG. 2 illustrates an example operational flow of system of FIG. 1 for monitoring and management of a cloud-based computing system.

As described above, previous technologies fail to provide effective and reliable solutions for monitoring and management of a cloud-based computing system. Embodiments of the present disclosure and their advantages may be understood by referring to FIGS. 1 and 2. FIGS. 1 and 2 are used to describe a system and method for monitoring and management of a cloud-based computing system.

System Overview

FIG. 1 illustrates an embodiment of a system 100 that is generally configured to monitor and manage a cloud-based computing system 101. In certain embodiments, the system 100 comprises the cloud-based computing system 101 operably coupled to a monitoring/management system 160 via a network 102. The cloud-based computing system 101 may be based on the Kubernetes architecture and may comprise a primary node 104 operably coupled to a plurality of worker nodes 124 (e.g., worker node 124-1 through worker node 124-n) via the network 102. Network 102 enables the communication between the components of the system 100. In other embodiments, the system 100 may not have all the components listed and/or may have other elements instead of, or in addition to, those listed above.

In general, the monitoring/management system 160 sends a data stream (e.g., data streams 182-1 through 182-m and 184-1 through 184-m) to a pod (e.g., pods 128-1 through 128-m and 150-1 through 150-k) of a worker node (e.g., worker nodes 124-1 through 124-n) of the cloud-based computing system 101, which triggers various monitoring tasks (e.g., tasks 134-1 through 134-m and 156-1 through 156-k) to be performed by the pod. The monitoring/management system 160 receives logs (e.g., logs 136-1 through 136-m and 158-1 through 158-k) from the pod that are used to monitor performance, load capacity, memory utilization, volume, and number of processes of the pod. The monitoring/management system 160 may determine an age 170 of the pod and, in response to the age 170 being less than an age threshold 172, determines a failure status of the pod based on the logs (e.g., logs 136-1 through 136-m and 158-1 through 158-k). The failure status may include a failure chance 174 and a failure timeline 178 for the pod. In response to the failure chance 174 being greater than a failure threshold 176, the monitoring/management system 160 sends a report 188 to the primary node 104. The report 188 may include the failure chance 174 for the pod, the failure timeline 178 for the pod, and a template 180 for the pod. The template 180 includes configuration information of the pod. The primary node 104 receives the report 188 and, in response to receiving the report 188, determines a load (e.g., loads 194-1 through 194-n) for the worker node (e.g., worker nodes 124-1 through 124-n). In response to the load (e.g., loads 194-1 through 194-n) being less than a load threshold 122, the primary node 104 updates a configuration of the pod based on the template 180.

In some embodiments, the monitoring/management system 160 monitors all pods of all worker nodes of the cloud-based computing system 101. In other embodiments, the monitoring/management system 160 may monitor select pods in each worker node of the cloud-based computing system 101. In yet other embodiments, the monitoring/management system 160 may monitor all or select pods in select worker nodes of the cloud-based computing system 101.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Cloud-Based Computing System

The cloud-based computing system 101 comprises the primary node 104 operably coupled to the plurality of worker nodes 124 (e.g., including worker node 124-1 through worker node 124-n) via the network 102.

Primary Node

Primary node 104 is generally any device that is configured to process data and interact with other components of the system 100 via the network 102. The primary node may comprise a processor 106 in signal communication with a memory 118 and a network interface 116.

Processor 106 comprises one or more processors operably coupled to the memory 118. The processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 106 may be a programmable logic device, a microcontroller, a microprocessor, or any suitable combination of the preceding. The one or more processors are configured to process data and may be implemented in hardware or software. For example, the processor 106 may be 8-bit, 16-bit, 32-bit, 64-bit, or of any other suitable architecture. The one or more processors are configured to implement various software instructions to perform the operations described herein. For example, the one or more processors are configured to execute software instructions 120 and perform one or more functions described herein.

Network interface 116 is configured to enable wired and/or wireless communications (e.g., via network 102). The network interface 116 is configured to communicate data between the primary node 104 and other components of the system 100. For example, the network interface 116 may comprise a WIFI interface, a local area network (LAN) interface, a wide area network (WAN) interface, a modem, a switch, or a router. The processor 106 is configured to send and receive data using the network interface 116. The network interface 116 may be configured to use any suitable type of communication protocol as would be appreciated by one of ordinary skill in the art.

Memory 118 may be volatile or non-volatile and may comprise a read-only memory (ROM), random-access memory (RAM), ternary content-addressable memory (TCAM), dynamic random-access memory (DRAM), and static random-access memory (SRAM). Memory 118 may be implemented using one or more disks, tape drives, solid-state drives, and/or the like. The memory 118 may store any of the information described in FIGS. 1 and 2 along with any other data, instructions, logic, rules, or code operable to implement the function(s) described herein when executed by the processor 106. The memory 118 is operable to store software instructions 120, and/or any other data and instructions. The software instructions 120 may comprise any suitable set of software instructions, logic, rules, or code operable to be executed by the processor 106.

In certain embodiments, the processor 106, when executing the software instructions 120, may implement various modules, such as an application programming interface (API) server 108, a scheduler 110, a controller/manager 112, and ETCD 114.

The primary node 104 may be configured to receive one or more reports 188 and one or more reports 190 from the monitoring/management system 160. In certain embodiments, each of the reports 188 may comprise a failure chance value 174 for a pod of the cloud-based computing system 101, a failure timeline 178 for the pod of the cloud-based computing system 101, a template 180 for the pod of the cloud-based computing system 101. The template 180 comprises a configuration for a respective pod of the cloud-based computing system 101.

In certain embodiments, each of the reports 190 may comprise an age information 192 for a respective pod of the cloud-based computing system 101 and a template 180 for the respective pod of the cloud-based computing system 101. The age information 192 includes an information that an age 170 of the pod is greater than an age threshold 172.

After receiving a report 188 or a report 190 for a pod belonging to a respective worker node (e.g. a respective one of worker node 124-1 through worker node 124-n) of the cloud-based computing system 101, the primary node 104 is further configured to determine a load (e.g., load 194-1 through load 194-n) of the respective worker node. In response to determining that the load for the respective worker node is less than a load threshold 122, the primary node 104 updates a configuration of the pod based on the template 180.

Worker Nodes

Each of the worker nodes 124-1 through 124-n is generally any device that is configured to process data and interact with other components of the system 100 via the network 102. Each of the worker nodes 124-1 through 124-n comprises a respective one of the processors 126-1 through 126-n in signal communication with a respective one of the memories 146-1 through 146-n and a respective one of network interfaces 144-1 through 144-n.

Each of the processors 126-1 through 126-n comprises one or more processors operably coupled to a respective one of the memories 146-1 through 146-n. Each of the processors 126-1 through 126-n is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 126-1 through 126-n may be a programmable logic device, a microcontroller, a microprocessor, or any suitable combination of the preceding. The one or more processors are configured to process data and may be implemented in hardware or software. For example, each of the processors 126-1 through 126-n may be 8-bit, 16-bit, 32-bit, 64-bit, or of any other suitable architecture. The one or more processors are configured to implement various software instructions to perform the operations described herein. For example, the one or more processors are configured to execute a respective one of software instructions 148-1 through 148-n and perform one or more functions described herein.

Each of the network interfaces 144-1 through 144-n is configured to enable wired and/or wireless communications (e.g., via network 102). Each of the network interfaces 144-1 through 144-n is configured to communicate data between a respective one of the worker nodes 124-1 through 124-n and other components of the system 100. For example, each of the network interfaces 144-1 through 144-n may comprise a WIFI interface, a local area network (LAN) interface, a wide area network (WAN) interface, a modem, a switch, or a router. Each of the processors 126-1 through 126-n is configured to send and receive data using a respective one of the network interfaces 144-1 through 144-n. Each of the network interfaces 144-1 through 144-n may be configured to use any suitable type of communication protocol as would be appreciated by one of ordinary skill in the art.

Each of the memories 146-1 through 146-n may be volatile or non-volatile and may comprise a read-only memory (ROM), random-access memory (RAM), ternary content-addressable memory (TCAM), dynamic random-access memory (DRAM), and static random-access memory (SRAM). Each of the memories 146-1 through 146-n may be implemented using one or more disks, tape drives, solid-state drives, and/or the like. Each of the memories 146-1 through 146-n may store any of the information described in FIGS. 1 and 2 along with any other data, instructions, logic, rules, or code operable to implement the function(s) described herein when executed by a respective one of the processors 126-1 through 126-n. Each of the memories 146-1 through 146-n is operable to store a respective one of software instructions 148-1 through 148-n, and/or any other data and instructions. Each of the software instructions 148-1 through 148-n may comprise any suitable set of software instructions, logic, rules, or code operable to be executed by a respective one of the processors 126-1 through 126-n.

In certain embodiments, each of the processors 126-1 through 126-n, when executing a respective one of software instructions 148-1 through 148-n, may implement one or more pods. For example, the processor 126-1 of the worker node 124-1 implements pods 128-1 through 128-m and the processor 126-n of the worker node 124-n implements pods 150-1 through 150-k.

Each pod may comprise one or more containers. Each container may comprise a one or more applications, libraries, and their dependencies. For example, the pod 128-1 comprises containers 130-1 through 130-3, the pod 128-m comprises containers 132-1 and 132-2, the pod 150-1 comprises containers 152-1 and 152-2, and the pod 150-k comprises containers 154-1 through 154-3. Each pod may comprise a desired number of containers. The number of containers in each pod may depend on design requirements for the pod.

Each pod may be configured to receive a data stream from the monitoring/management system 160, perform respective tasks and generated respective logs. Logs generated by a pod may comprise information about performance, load capacity, memory utilization, volume, and number of processes of the pod. For example, each of pods 128-1 through 128-m receives a respective one of the data streams 182-1 through 182-*m*, performs a respective one of the tasks 134-1 through 134-*m*, and generates a respective one of the logs 136-1 through 136-*m*. Each of the pods 150-1 through 150-*k* receives a respective one of the data streams 184-1 through 184-*k*, performs a respective one of the tasks 156-1 through 156-*k*, and generates a respective one of the logs 158-1 through 158-*k*.

In certain embodiments, each of the processors 126-1 through 126-*n*, when executing a respective one of the software instructions 148-1 through 148-*n*, may implement various modules such as a respective one of dockers 138-1 through 138-*n*, a respective one of kubelets 140-1 through 140-*n*, and a respective one of kube-proxies 142-1 through 142-*n*.

Monitoring/Management System

The monitoring/management system 160 is generally any device that is configured to process data and communicate with other components of the system 100 via the network 102. The monitoring/management system 160 may comprise a processor 162 in signal communication with a memory 166 and a network interface 164.

Processor 162 comprises one or more processors operably coupled to the memory 166. The processor 162 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The one or more processors are configured to implement various software instructions to perform the operations described herein. For example, the one or more processors are configured to execute software instructions 168 and perform one or more functions described herein.

Network interface 164 is configured to enable wired and/or wireless communications (e.g., via network 102). The network interface 164 is configured to communicate data between the monitoring/management system 160 and other components of the system 100. For example, the network interface 164 may comprise a WIFI interface, a local area network (LAN) interface, a wide area network (WAN) interface, a modem, a switch, or a router. The processor 162 is configured to send and receive data using the network interface 164. The network interface 164 may be configured to use any suitable type of communication protocol as would be appreciated by one of ordinary skill in the art.

Memory 166 may be volatile or non-volatile and may comprise a read-only memory (ROM), random-access memory (RAM), ternary content-addressable memory (TCAM), dynamic random-access memory (DRAM), and static random-access memory (SRAM). Memory 166 may be implemented using one or more disks, tape drives, solid-state drives, and/or the like. The memory 166 may store any of the information described in FIGS. 1 and 2 along with any other data, instructions, logic, rules, or code operable to implement the function(s) described herein. The memory 166 is operable to store software instructions 168, and/or any other data and instructions. The software instructions 168 may comprise any suitable set of software instructions, logic, rules, or code operable to be executed by the processor 162.

Memory 166 may further store various parameters and data that are used by the monitoring/management system 160 during operation. For example, the memory 166 may store age thresholds 172, failure thresholds 176, and templates 180. Each template 180 includes configuration information of a respective pod.

In operation, the monitoring/management system 160 sends data streams (e.g., data streams 182-1 through 182-*m* and data streams 184-1 through 184-*k*) to each pod (e.g., pods 128-1 through 128-*m* and pods 150-1 through 150-*k*) of each worker node (e.g., worker nodes 124-1 through 124-*n*) of the cloud-based computing system 101. For example, the monitoring/management system 160 sends the data streams 182-1 through 182-*m* to the pods 128-1 through 128-*m*, respectively, and the data streams 184-1 through 184-*k* to the pods 150-1 through 150-*k*, respectively.

The monitoring/management system 160 receives a plurality of logs 186 from all pods of all worker nodes of the cloud-based computing system 101 and store them in the memory 166. For example, the logs 186 may comprise the logs 136-1 through 136-*m* generated by the pods 128-1 through 128-*m* of the worker node 142-1 and the logs 158-1 through 158-*k* generated by the pods 150-1 through 150-*k* of the worker node 142-*n*.

The monitoring/management system 160 chooses a pod (e.g., any of pods 128-1 through 128-*m* and 150-1 through 150-*k*) and determines an age 170 of the chosen pod. Subsequently, the monitoring/management system 160 compares the age 170 of the chosen pod to the age threshold 172.

In response to determining that the age 170 is greater than or equal to the age threshold 172, the monitoring/management system 160 sends a report 190 to the primary node 104. The report 190 may comprise an age information 192 of the chosen pod and a template 180 of the chosen pod. The age information 192 comprises information that the age 170 of the chosen pod is greater than or equal to the first age threshold 172.

In response to determining that the age 170 is less than the age threshold 170, the monitoring/management system 160 determines a failure chance 174 and a failure timeline 178 for the chosen pod based on the logs 186. Subsequently, the monitoring/management system 160 compares the failure chance 174 of the chosen pod to a failure threshold 176.

In response to determining that the failure chance 174 of the chosen pod is less than or equal to the failure threshold 176, the monitoring/management system 160 chooses a next pod and repeats operations described above for the next chosen pod.

In response to determining that the failure chance 174 of the chosen pod is greater than the failure threshold 176, the monitoring/management system 160 sends a report 188 to the primary node 104. The report 188 may comprise the failure chance 174 for the chosen pod, the failure timeline 178 for the chosen pod, and a template 180 for the chosen pod.

The monitoring/management system 160 determines if performances of all pods are analyzed. In response to determining that performances of all pods are not analyzed, the monitoring/management system 160 chooses a next pod and repeats operations described above for the next chosen pod. In response to determining that performances of all pods are analyzed, the monitoring/management system 160 may perform the above-described operations in a loop as long as pod monitoring/management is needed for the cloud-based computing system 101.

Example Method for Monitoring and Management of a Cloud-Based Computing System

FIG. 2 illustrates an example flowchart of a method 200 for monitoring and management of a cloud-based computing system. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 120, 148-1 through 148-n, and/or 168 of FIG. 1), stored on non-transitory, tangible, machine-readable medium (e.g., memories 118, 146-1 through 146-n, and/or 166 of FIG. 1) that when executed by one or more processors (e.g., processors 106, 126-1 through 126-n, and/or 162 of FIG. 1) may cause the one or more processors to perform operations 202-234.

At operation 202, a monitoring/management system 160 sends data streams (e.g., data streams 182-1 through 182-m and data streams 184-1 through 184-k of FIG. 1) to each pod (e.g., pods 128-1 through 128-m and pods 150-1 through 150-k of FIG. 1) of each worker node (e.g., worker nodes 124-1 through 124-n of FIG. 1) of a cloud-based computing system 101. The cloud-based computing system 101 comprises a primary node 104 operably coupled to a plurality of worker nodes 124 (e.g., worker node 124-1 through worker node 124-n of FIG. 1) via the network 102.

At operation 204, the monitoring/management system 160 receives a plurality of logs 186 from each pod (e.g., pods 128-1 through 128-m and pods 150-1 through 150-k of FIG. 1) of each worker node (e.g., worker nodes 124-1 through 124-n of FIG. 1) of the cloud-based computing system 101. For example, the logs 186 may comprise logs 136-1 through 136-m generated by the pods 128-1 through 128-m of the worker node 142-1 and logs 158-1 through 158-k generated by the pods 150-1 through 150-k of the worker node 142-n.

At operation 206, the monitoring/management system 160 chooses a pod (e.g., any of pods 128-1 through 128-m and 150-1 through 150-k).

At operation 208, the monitoring/management system 160 determines an age 170 of the chosen pod.

At operation 210, the monitoring/management system 160 compares the age 170 to an age threshold 172 for the chosen pod.

At operation 212, the monitoring/management system 160 determines if the age 170 is less than the age threshold 172.

In response to determining at operation 212 that the age 170 is less than the age threshold 172, method 200 continues to operation 214, where the monitoring/management system 160 determines a failure chance 174 and a failure timeline 178 for the chosen pod.

At operation 216, the monitoring/management system 160 compare the failure chance 174 to a failure threshold 176 for the chosen pod.

At operation 218, the monitoring/management system 160 determines if the failure chance 174 is greater than the failure threshold 176.

In response to determining at operation 218 that the failure chance 174 is greater than the failure threshold 176, method 200 continues to operation 222, where the monitoring/management system 160 sends a report 188 to the primary node 104 of the cloud-based computing system 101. The report 188 comprises the failure chance 174 for the chosen pod, the failure timeline 178 for the chosen pod, and a template 180 for the chosen pod.

In response to determining at operation 212 that the age 170 is greater than or equal to the age threshold 172, method 200 continues to operation 220, where the monitoring/management system 160 sends a report 190 to the primary node 104 of the cloud-based computing system 101. The report 190 comprises an age information 192 of the chosen pod and a template 180 of the chosen pod. The age information 192 comprises information that the age 170 of the chosen pod is greater than or equal to the age threshold 172.

After sending the report 190 or 188 to the primary node 104 of the cloud-based computing system 101 at operation 220 or operation 222, method 200 continues to operation 224, where the primary node 104 of the cloud-based computing system 101 determines a load (e.g., a respective one of loads 194-1 through 194-n) for a respective worker node (e.g., a respective one of worker nodes 124-1 through 124-n) of the chosen pod.

At operation 226, the primary node 104 of the cloud-based computing system 101 compares the load (e.g., a respective one of loads 194-1 through 194-n) to a load threshold 122.

At operation 228, the primary node 104 of the cloud-based computing system 101 determines if the load (e.g., a respective one of loads 194-1 through 194-n) is less than the load threshold 122.

In response to determining at operation 228 that the load (e.g., a respective one of loads 194-1 through 194-n) is greater than or equal to the load threshold 122, method 200 continues back to operation 224.

In response to determining at operation 228 that the load (e.g., a respective one of loads 194-1 through 194-n) is less than the load threshold 122, method 200 continues to operation 230, where the primary node 104 of the cloud-based computing system 101 updates a configuration of the chosen pod based on the template 180. In certain embodiments, the primary node 104 of the cloud-based computing system 101 may send respective instructions to the worker node (e.g., a respective one worker nodes 124-1 through 124-n) of the chosen pod. For example, if the chosen pod belongs to the worker node 124-1, the primary node 104 may send instructions 196 to the worker node 124-1. If the chosen pod belongs to the worker node 124-n, the primary node 104 may send instructions 198 to the worker node 124-n.

At operation 232, the monitoring/management system 106 determines if performances of all pods are analyzed.

In response to determining at operation 232 that performances of all pods are not analyzed or in response to determining at operation 218 that the failure chance 174 is less than or equal to the failure threshold 176, method 200 continues to operation 234, where the monitoring/management system 160 chooses a next pod of the cloud-based computing system 101. After operation 234, method 200 continues back to operation 208.

In response to determining at operation 232 that performances of all pods are analyzed, method 200 continues back to operation 202, such that operations 202-234 are performed in a loop as long as pod monitoring/management is needed for the cloud-based computing system 101.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a cloud-based computing system comprising:
      a primary node; and
      a plurality of worker nodes communicatively coupled to the primary node, wherein each worker node comprises a plurality of pods, and wherein each pod comprises a plurality of containers; and
   a monitoring/management system communicatively coupled to the cloud-based computing system, wherein the monitoring/management system comprises:
      a memory configured to store:
         a plurality of templates, wherein each template comprises configuration information of a respective pod;
         an age threshold for each pod; and
         a failure threshold for each pod; and
      a processor communicatively coupled to the memory, wherein the processor is configured to:
         send a first data stream to a first pod of a first worker node;
         receive a first plurality of logs from the first pod of the first worker node, wherein the first plurality of logs are generated by the first pod while processing the first data stream;
         determine a first age of the first pod;
         compare the first age to a first age threshold for the first pod;
         in response to the first age being less than the first age threshold, determine a first failure status of the first pod based on the first plurality of logs, wherein determining the first failure status of the first pod comprises determining a first failure chance and a first failure timeline for the first pod based on the first plurality of logs;
         compare the first failure chance to a first failure threshold for the first pod; and
         in response to the first failure chance being greater than the first failure threshold, send a first report to the primary node, wherein the first report comprises:
            the first failure chance for the first pod;
            the first failure timeline for the first pod; and
            a first template for the first pod, wherein the primary node is configured to:
               in response to receiving the first report, determine a first load for the first worker node;
               compare the first load to a first load threshold; and
               in response to the first load being less than the first load threshold, update a first configuration of the first pod based on the first template.

2. The system of claim 1, wherein the processor is further configured to:
   in response to the first age being greater than the first age threshold, send a second report to the primary node, wherein the second report comprises:
      information that the first age is greater than the first age threshold; and
      the first template for the first pod.

3. The system of claim 1, wherein the first data stream triggers one or more tasks for the first pod.

4. The system of claim 1, wherein the processor is further configured to:
   send a second data stream to a second pod of a second worker node;
   receive a second plurality of logs from the second pod of the second worker node, wherein the second plurality of logs are generated by the second pod while processing the second data stream;
   determine a second age of the second pod;
   compare the second age to a second age threshold for the second pod;
   in response to the second age being less than the second age threshold, determine a second failure status of the second pod based on the second plurality of logs, wherein determining the second failure status of the second pod comprises determining a second failure chance and a second failure timeline for the second pod based on the second plurality of logs;
   compare the second failure chance to a second failure threshold for the second pod; and
   in response to the second failure chance being greater than the second failure threshold, send a second report to the primary node, wherein the second report comprises:
      the second failure chance for the second pod;
      the second failure timeline for the second pod; and
      a second template for the second pod, wherein the primary node is further configured to:
         in response to receiving the second report, determine a second load for the second worker node;
         compare the second load to a second load threshold; and
         in response to the second load being less than the second load threshold, update a second configuration of the second pod based on the second template.

5. The system of claim 4, wherein the processor is further configured to:
   in response to the second age being greater than the second age threshold, send a third report to the primary node, wherein the third report comprises:
      information that the second age is greater than the second age threshold; and
      the second template for the second pod.

6. The system of claim 1, wherein the processor is further configured to:
   send a second data stream to a second pod of the first worker node;
   receive a second plurality of logs from the second pod of the first worker node, wherein the second plurality of logs are generated by the second pod while processing the second data stream;

determine a second age of the second pod;
compare the second age to a second age threshold for the second pod;
in response to the second age being less than the second age threshold, determine a second failure status of the second pod based on the second plurality of logs, wherein determining the second failure status of the second pod comprises determining a second failure chance and a second failure timeline for the second pod based on the second plurality of logs;
compare the second failure chance to a second failure threshold for the second pod; and
in response to the second failure chance being greater than the second failure threshold, send a second report to the primary node, wherein the second report comprises:
the second failure chance for the second pod;
the second failure timeline for the second pod; and
a second template for the second pod, wherein the primary node is further configured to:
in response to receiving the second report, determine a second load for the first worker node;
compare the second load to a second load threshold; and
in response to the second load being less than the second load threshold, update a second configuration of the second pod based on the second template.

7. The system of claim 6, wherein the processor is further configured to:
in response to the second age being greater than the second age threshold, send a third report to the primary node, wherein the third report comprises:
information that the second age is greater than the second age threshold; and
the second template for the second pod.

8. A method comprising:
sending a first data stream to a first pod of a first worker node of a cloud-based computing system, wherein the cloud-based computing system comprises:
a primary node; and
a plurality of worker nodes communicatively coupled to the primary node, wherein each worker node comprises a plurality of pods, and wherein each pod comprises a plurality of containers;
receiving a first plurality of logs from the first pod of the first worker node, wherein the first plurality of logs are generated by the first pod while processing the first data stream;
determining a first age of the first pod;
comparing the first age to a first age threshold for the first pod;
in response to the first age being less than the first age threshold, determining a first failure status of the first pod based on the first plurality of logs, wherein determining the first failure status of the first pod comprises determining a first failure chance and a first failure timeline for the first pod based on the first plurality of logs;
comparing the first failure chance to a first failure threshold for the first pod;
in response to the first failure chance being greater than the first failure threshold, sending a first report to the primary node, wherein the first report comprises:
the first failure chance for the first pod;
the first failure timeline for the first pod; and
a first template for the first pod;
in response to receiving the first report, determining a first load for the first worker node;
comparing the first load to a first load threshold; and
in response to the first load being less than the first load threshold, updating a first configuration of the first pod based on the first template.

9. The method of claim 8, further comprising:
in response to the first age being greater than the first age threshold, sending a second report to the primary node, wherein the second report comprises:
information that the first age is greater than the first age threshold; and
the first template for the first pod.

10. The method of claim 8, wherein the first data stream triggers one or more tasks for the first pod.

11. The method of claim 8, further comprising:
sending a second data stream to a second pod of a second worker node;
receiving a second plurality of logs from the second pod of the second worker node, wherein the second plurality of logs are generated by the second pod while processing the second data stream;
determining a second age of the second pod;
comparing the second age to a second age threshold for the second pod;
in response to the second age being less than the second age threshold, determining a second failure status of the second pod based on the second plurality of logs, wherein determining the second failure status of the second pod comprises determining a second failure chance and a second failure timeline for the second pod based on the second plurality of logs;
comparing the second failure chance to a second failure threshold for the second pod;
in response to the second failure chance being greater than the second failure threshold, sending a second report to the primary node, wherein the second report comprises:
the second failure chance for the second pod;
the second failure timeline for the second pod; and
a second template for the second pod;
in response to receiving the second report, determining a second load for the second worker node;
comparing the second load to a second load threshold; and
in response to the second load being less than the second load threshold, updating a second configuration of the second pod based on the second template.

12. The method of claim 11, further comprising:
in response to the second age being greater than the second age threshold, sending a third report to the primary node, wherein the third report comprises:
information that the second age is greater than the second age threshold; and
the second template for the second pod.

13. The method of claim 8, further comprising:
sending a second data stream to a second pod of the first worker node;
receiving a second plurality of logs from the second pod of the first worker node, wherein the second plurality of logs are generated by the second pod while processing the second data stream;
determining a second age of the second pod;
comparing the second age to a second age threshold for the second pod;
in response to the second age being less than the second age threshold, determining a second failure status of the second pod based on the second plurality of logs, wherein determining the second failure status of the second pod comprises determining a second failure chance and a second failure timeline for the second pod based on the second plurality of logs;
comparing the second failure chance to a second failure threshold for the second pod;
in response to the second failure chance being greater than the second failure threshold, sending a second report to the primary node, wherein the second report comprises:
the second failure chance for the second pod;
the second failure timeline for the second pod; and
a second template for the second pod;
in response to receiving the second report, determining a second load for the first worker node;
comparing the second load to a second load threshold; and
in response to the second load being less than the second load threshold, updating a second configuration of the second pod based on the second template.

14. The method of claim 13, further comprising:
in response to the second age being greater than the second age threshold, sending a third report to the primary node, wherein the third report comprises:
information that the second age is greater than the second age threshold; and
the second template for the second pod.

15. A non-transitory computer-readable medium storing instructions that, when executed by one or more processors, cause the one or more processors to:
send a first data stream to a first pod of a first worker node of a cloud-based computing system, wherein the cloud-based computing system comprises:
a primary node; and
a plurality of worker nodes communicatively coupled to the primary node, wherein each worker node comprises a plurality of pods, and wherein each pod comprises a plurality of containers;
receive a first plurality of logs from the first pod of the first worker node, wherein the first plurality of logs are generated by the first pod while processing the first data stream;
determine a first age of the first pod;
compare the first age to a first age threshold for the first pod;
in response to the first age being less than the first age threshold, determine a first failure status of the first pod based on the first plurality of logs, wherein determining the first failure status of the first pod comprises determining a first failure chance and a first failure timeline for the first pod based on the first plurality of logs;
compare the first failure chance to a first failure threshold for the first pod;
in response to the first failure chance being greater than the first failure threshold, send a first report to the primary node, wherein the first report comprises:
the first failure chance for the first pod;
the first failure timeline for the first pod; and
a first template for the first pod;
in response to receiving the first report, determine a first load for the first worker node;
compare the first load to a first load threshold; and
in response to the first load being less than the first load threshold, update a first configuration of the first pod based on the first template.

16. The non-transitory computer-readable medium of claim 15, wherein the instructions, when executed by the one or more processors, further cause the one or more processors to:

in response to the first age being greater than the first age threshold, send a second report to the primary node, wherein the second report comprises:
information that the first age is greater than the first age threshold; and
the first template for the first pod.

17. The non-transitory computer-readable medium of claim 15, wherein the first data stream triggers one or more tasks for the first pod.

18. The non-transitory computer-readable medium of claim 15, wherein the instructions, when executed by the one or more processors, further cause the one or more processors to:
send a second data stream to a second pod of a second worker node;
receive a second plurality of logs from the second pod of the second worker node, wherein the second plurality of logs are generated by the second pod while processing the second data stream;
determine a second age of the second pod;
compare the second age to a second age threshold for the second pod;
in response to the second age being less than the second age threshold, determine a second failure status of the second pod based on the second plurality of logs, wherein determining the second failure status of the second pod comprises determining a second failure chance and a second failure timeline for the second pod based on the second plurality of logs;
compare the second failure chance to a second failure threshold for the second pod;
in response to the second failure chance being greater than the second failure threshold, send a second report to the primary node, wherein the second report comprises:
the second failure chance for the second pod;
the second failure timeline for the second pod; and
a second template for the second pod;
in response to receiving the second report, determine a second load for the second worker node;
compare the second load to a second load threshold; and
in response to the second load being less than the second load threshold, update a second configuration of the second pod based on the second template.

19. The non-transitory computer-readable medium of claim 18, wherein the instructions, when executed by the one or more processors, further cause the one or more processors to:
in response to the second age being greater than the second age threshold, send a third report to the primary node, wherein the third report comprises:
information that the second age is greater than the second age threshold; and
the second template for the second pod.

20. The non-transitory computer-readable medium of claim 15, wherein the instructions, when executed by the one or more processors, further cause the one or more processors to:
send a second data stream to a second pod of the first worker node;
receive a second plurality of logs from the second pod of the first worker node, wherein the second plurality of logs are generated by the second pod while processing the second data stream;
determine a second age of the second pod;
compare the second age to a second age threshold for the second pod;

in response to the second age being less than the second age threshold, determine a second failure status of the second pod based on the second plurality of logs, wherein determining the second failure status of the second pod comprises determining a second failure chance and a second failure timeline for the second pod based on the second plurality of logs;

compare the second failure chance to a second failure threshold for the second pod;

in response to the second failure chance being greater than the second failure threshold, send a second report to the primary node, wherein the second report comprises:
the second failure chance for the second pod;
the second failure timeline for the second pod; and
a second template for the second pod;

in response to receiving the second report, determine a second load for the first worker node;

compare the second load to a second load threshold; and in response to the second load being less than the second load threshold, update a second configuration of the second pod based on the second template.

\* \* \* \* \*